United States Patent [19]
Lupinski et al.

[11] Patent Number: 6,061,016
[45] Date of Patent: May 9, 2000

[54] METHOD FOR THE ATTENUATION OF THE CLUTTER COMING FROM THE REFLECTION LOBES OF A RADAR ANTENNA

[75] Inventors: Ludovic Lupinski, Chatillon-sous-Bagneux; Bertrand Regnier, Chatenay-Malabry, both of France

[73] Assignee: Thomson-CSF, Paris, France

[21] Appl. No.: 09/188,325

[22] Filed: Nov. 9, 1998

[30] Foreign Application Priority Data

Nov. 12, 1997 [FR] France ................................. 97 14162

[51] Int. Cl.⁷ .............................. G01S 13/00; G01S 3/16; H01Q 3/24
[52] U.S. Cl. .......................... 342/159; 342/175; 342/195; 342/378; 342/379; 342/381; 342/384
[58] Field of Search ..................................... 342/159, 160, 342/161, 162, 163, 164, 175, 192, 193, 194, 195, 196, 197, 378, 379, 380, 381, 382, 383, 384

[56] References Cited

U.S. PATENT DOCUMENTS 4,688,187   8/1987   McWhirter ........................... 342/381 X
5,163,176  11/1992   Flumerfelt et al. .
5,506,586   4/1996   Bull .
5,635,939   6/1997   Chekroun ................................. 342/384

OTHER PUBLICATIONS

Kiyonobu Abe, et al., "Radar Sidelobe Canceller Characteristics in High Power Interference", IEICE Transactions on Communications, vol. E78–B, No. 11, Nov. 1, 1995, pp. 1507–1512.

Stanley M. Yuen, "Algorithmic, Architectural, and Beam Pattern Issues of Sidelobe Cancellation", IEEE Transactions on Aerospace and Electronic Systems, vol. 25, No. 4, Jul. 1989, pp. 459–471.

"Antenna Sidelobe Requirements for the Medium PRF Mode of an Airborne Radar"; by Guy V. Morris; "Microwave Journal", Sep. 1989.

*Primary Examiner*—Benarr E. Gregory
*Attorney, Agent, or Firm*—Oblon, Spivak, McClelland, Maier & Neustadt, P.C.

[57] ABSTRACT

The disclosed method uses the ancillary antennas of a radar, and consists in determining the positions of the phase centers of these ancillary antennas, compensating for the difference in optical path between the reflection lobe of the processed channel and that of the ancillary channel, and generating a synthetic channel by an SLO type processing in performing a coherent subtraction between the processed channel and the ancillary channels used, on the desensitized zone of the doppler distance/frequency ambiguous domain of each of the processed channels.

6 Claims, 2 Drawing Sheets

METHOD FOR THE ATTENUATION OF THE CLUTTER COMING FROM THE REFLECTION LOBES OF A RADAR ANTENNA

BACKGROUND OF THE INVENTION

The present invention relates to a method for the attenuation of the clutter coming from the reflection lobes of a radar antenna It is known that the ground clutter picked up by the reflection lobes causes pollution in some zones of the ambiguous distance-frequency domain of a radar. In particular, the reflection lobes of the radome of a radar antenna may "illuminate" the ground above which the antenna is placed. These reflection lobes therefore pick up the ground clutter which disturbs the signal received by the antenna. In order to diminish the deleterious effects of this clutter, and reduce the false alarm rate, it is the general practice to desensitize the radar on the zones that are polluted in this way. This has the consequence of reducing the distance of detection of the targets.

SUMMARY OF THE INVENTION

An object of the present invention is a method for the attenuation of the clutter coming from the reflection lobes of a radar antenna comprising a main antenna and at least one antenna known as an "ancillary" (non-principal) antenna, this method enabling the improvement of the detection of targets in the polluted zones by an appreciable reduction of clutter, without disturbing the angular measurements.

The method according to the invention consists in determining the position of the phase center of each ancillary channel as well as the position of the local phase centers of each angular zone of the reflection lobe, modelling or memorizing these positions and then, in the doppler distance/frequency ambiguous domain, for each computation channel processed and for each ancillary channel, compensating for the difference in optical path between the ancillary channel and the processed channel, and generating a synthetic channel by an SLO type processing in performing a coherent subtraction between the signals of the processed channel considered and those of the ancillary channel considered, on the zone of the doppler distance/frequency ambiguous domain of each of the processed channels. Preferably, the compensation and the coherent subtraction are done in the desensitized zone of the ambiguous domains considered.

BRIEF DESCRIPTION OF THE DRAWINGS

The present invention will be understood more clearly from the following detailed description of an exemplary embodiment, taken by way of a non-restrictive example and illustrated by the appended drawings, of which.

MORE DETAILED DESCRIPTION

Figure 1:
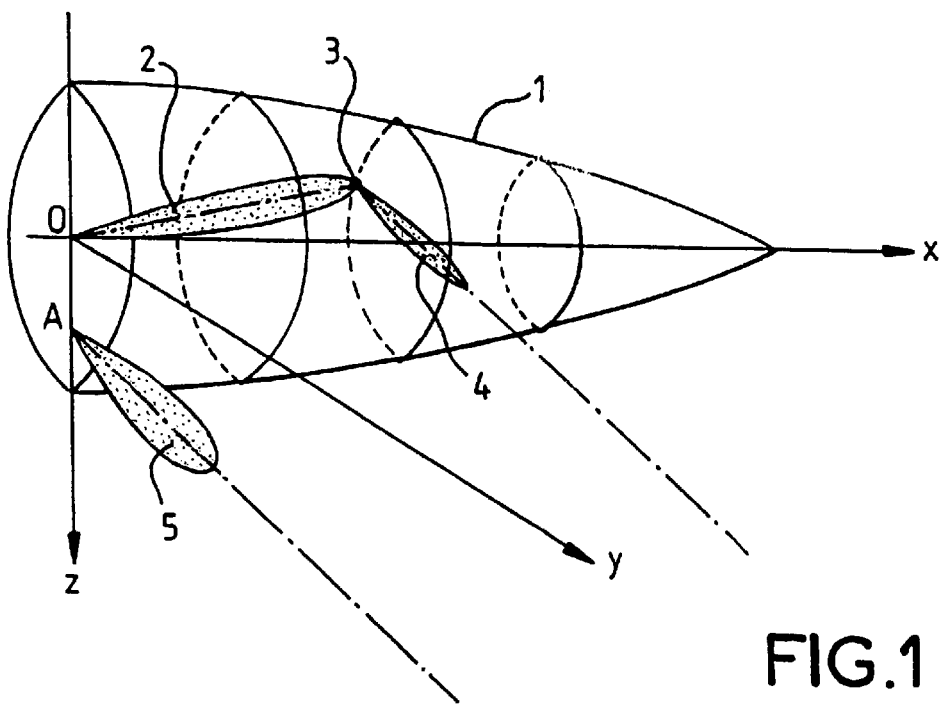
FIG. 1 is a drawing providing a view, for a radome-sheltered airborne radar, of the optical path that has to be compensated for by the method of the invention because of a reflection on the radome.

The invention is described here below with reference to a airborne radar but it is clear that it is not limited to this application alone and that it can be implemented in other types of radars whose reception signal can be affected by clutter received by reflection lobes, whatever the cause of this clutter.

The airborne firing control radars in which the invention was designed are Mean Recurrence Frequency doppler type radars. They generally comprise a main antenna and at least one ancillary antenna (namely an antenna other than the main antenna).

The antennas with which a radar of this type is equipped are mechanically protected by a radome made of dielectric material. Their reflection lobes pick up several parasitic signals. Those reflection lobes that get reflected on the radome pick up, in particular, clutter from the ground which greatly disturbs the received signal. To reduce the effect of these disturbances and not excessively limit the range of the radar, action is taken directly on the radome in order to reduce the reflective effect. In this case, the radome wall may be either a monolithic wall made out of a low-reflective material whose dielectric index is as close as possible to that of air or it may be a multilayer wall made of several layers of different materials. The latter approach enables a reduction of the reflections but is more costly than the former. However, these radome-making techniques have limited efficiency because of the constraints imposed on airborne materials, which restrict the choice of the materials that can be used. This does not make it possible to resolve the problem of the disturbances created by the clutter which may extremely inconvenient.

The method of the invention seeks to greatly reduce the parasitic signals picked up by the reflection lobes. To this end, it implements a spatial temporal processing operation that has certain similarities with an SLO (side lobes opposition) processing modified as described here below.

SLO processing is a technique well known to those skilled in the art. It is used to eliminate the problems caused by noise jammers whose transmission, derived from a localized source, is received by the scattered lobes of a radar antenna.

The method of the invention is aimed at processing the ground clutter which is a form of pollution derived from an entire angular zone. It implements a common physical property of the reflection lobes that enables the definition of one local phase center per angular zone of a reflection lobe.

This method can be implemented for all the useful channels to be processed (sum channels and difference channels) and has recourse to the ancillary channels of the radar which it exploits as ancillary computation channels. These ancillary channels are those of the ancillary antennas distinct from the main antenna and may be positioned in any way with respect to this antenna.

The method of the invention consists, in a first stage, in determining the position of the local phase centers of the reflection lobe or lobes and the position of the phase centers of the ancillary path or paths through the measurement of their radiation pattern. These positions are then memorized or modellized.

In general, it is not certain that the phase center of a reflection lobe exists throughout the angular domain of this lobe. This is certain only in limited angular zones. For the spatial processing of the invention, it is necessary and sufficient to have a locally defined phase center for each main angular zone corresponding to a (distance/frequency) resolution interval. The local phase center (R) is then defined by the following equation:

$$\forall v, w \in \Omega' : \phi(v, w) - \frac{2\pi}{\lambda} \overrightarrow{OR} \cdot \vec{n} = \text{constant}$$

In this equation, we have:

$\Omega'$: angular zone of the reflection lobe corresponding to a resolution interval 0: starting point of the measurement of the pattern in phase $\phi(v, w)$: phase of the pattern in the reflection lobe on the radome $\vec{n}(u, v, w)$: direction cosine defining a point of the radiation pattern.

The center R can be computed by the least error squares method, which consists in minimizing the following function:

$$\Sigma(v, w) \in \Omega' \left\| \phi(v, w) \frac{-2\pi}{\lambda} \overrightarrow{OR} \cdot \vec{n} = \text{constant} \right\|^2$$

The precision required on the position of the local center R is small as compared with the wavelength, for the coefficients $W_i$ (the adaptive coefficients mentioned here below in the step for the formation of a synthetic channel) are estimated locally on an equivalent angular zone of a few degrees for the usual values of resolution of the radar modes, namely a distance resolution of a few tens of meters and a frequency resolution of a few hundreds of Hertz.

If we use a high resolution mode, it is possible either to increase the performance of the processing or to reduce the precision of localization of the phase center.

It will be noted that the local character of the computation of the coefficients $W_i$ ensures the robustness of the processing operation and improves the performance characteristics.

Similarly, the phase center of an ancillary channel is determined from the measurement of its radiation pattern.

The next step of the method of the invention consists, for each ancillary channel, in compensating for the difference in optical path between the ancillary channel considered and the processed channel (sum or difference channel). This path difference is the one encountered between the different directions of the angular zone of the reflection lobe on the radome of the antenna. FIG. 1 provides a schematic view of this path difference.

FIG. 1 shows the radome 1 with a symmetry of revolution about an axis Ox that is parallel to the longitudinal axis of the carrier aircraft and is also the axis of the main antenna (not shown) positioned in the radome 1, the point or origin O being in the plane of the main antenna. The figure also shows the axis Oy, perpendicular to Ox and parallel to the wings of the aircraft, as well as the axis Oz directed towards the ground and perpendicular to the plane of the axes Ox and Oy when the aircraft is in horizontal flight. The reference 2 shows a lobe of the main antenna, starting from the point of origin O and directed towards the radome 1. This lobe 2 gets reflected at 3 on the radome and produces a reflection lobe 4 directed towards the ground. The figure also shows, at A, the source of an ancillary antenna positioned beneath the main antenna and, at 5, a lobe of this ancillary antenna. A step of the method of the invention consists in compensating for the difference in optical return path between the reflection lobe of the processed channel (of the indirect path 2–4 passing through the point 3) and the reflection lobe of the ancillary channel (of the direct path through 5). This compensation consists in "shifting" the phase center of each ancillary channel (or of the single ancillary channel as the case may be) to make it coincide with the phase center of the reflection lobe according to the following formula:

$$\phi(\vec{n}) = 2\pi \frac{A \vec{R} \cdot \vec{n}}{\lambda}$$

with:

A: position of the phase center of the radiation pattern of the ancillary antenna, R: position of the phase center of the reflection lobe on the radome, $\lambda$: wavelength used, $\vec{n} = (u,v,w)$: direction cosine defining a point of the radiation patterns of the ancillary antenna and of the processed channel, in a common reference system.

Figure 2:
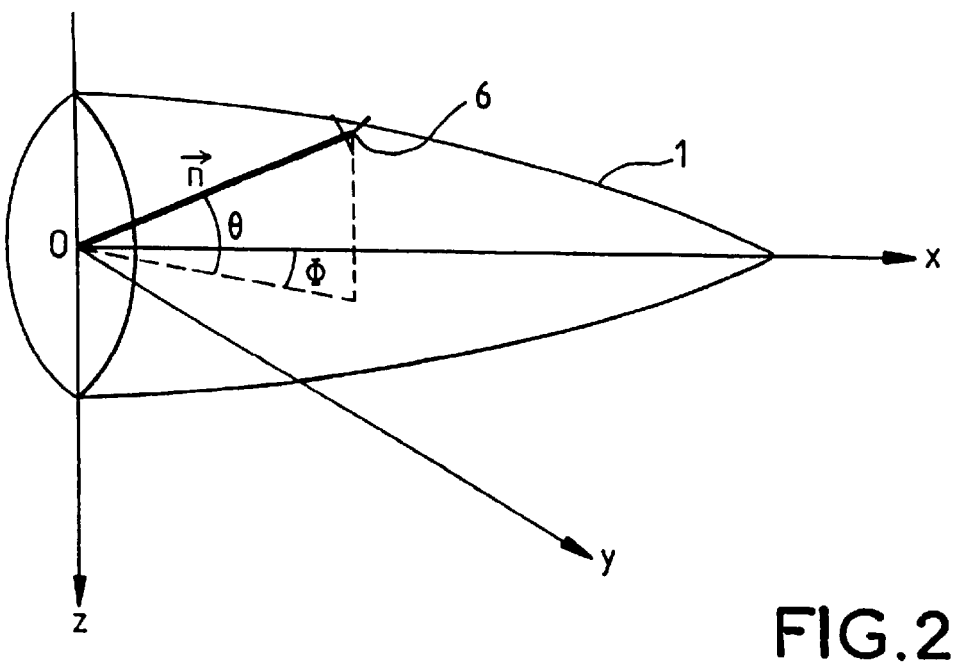
FIGS. 2 and 3 are drawings giving a view, for the radar of FIG. 1, of the parameters used by the method of the invention.

FIG. 2 shows an exemplary common reference for which the compensation formula indicated here above is applicable. This FIG. 2 takes up the data of FIG. 1 (radome 1, axes Ox, Oy, Oz). Let us take a point 6 on the radome 1. The vector joining the point 6 to the point O (common point of origin of the axes Ox, Oy, Oz) is called $\vec{n}$, the point 6 being also a point located on a sphere having a radius equal to one (the sphere being standardized in order to simplify the computations). Let $\theta$ be the elevation angle of the point 6 and $\phi$ its azimuth angle. In the above compensation formula, we then have, for the present example:

u=cos $\theta$ cos $\phi$ v=cos $\theta$ sine $\phi$ w=−sine $\theta$

The compensation explained here above can also be applied to the distance-frequency ambiguous domain. From each distance-frequency interval of an ancillary channel, $\phi(\vec{n})$ is subtracted, $\vec{n}$ being the direction of the radiation pattern corresponding to the distance-frequency interval considered. The computation of the distance-frequency interval correspondence $\leftrightarrows \vec{n}$, is a usual step in a synthetic clutter computation which is known to those skilled in the art.

The above-mentioned correspondence is generally not bijective, because of the spectral aliasings in distance or in frequency. Indeed, to one (distance-frequency) interval there correspond several directions. For this reason, the invention provides for obtaining a correspondence for the main direction, namely the direction for which the clutter level is, a priori, the greatest. This direction is defined by the shortest distance between the carrier aircraft and the ground.

Figure 3:
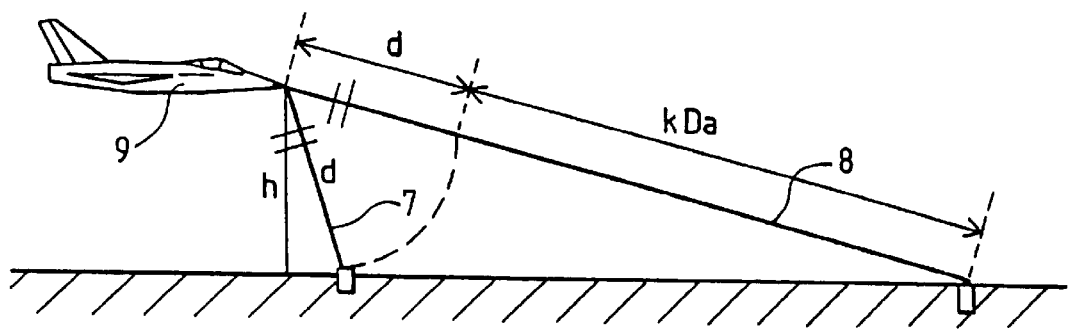

FIG. 3 illustrates this correspondence on the axis of distances, between the main direction and the (distance-frequency) interval of the (doppler distance-frequency) ambiguous domain. In this FIG. 3, the reference 7 designates the main direction and the reference 8 designates one of the ambiguous directions. The reference h designates the altitude of the carrier aircraft 9, the reference d designates the distance in the (doppler distance-frequency) ambiguous domain along the direction 7. Da is the ambiguous distance (along the direction 8) and k is an integer. The invention is therefore particularly applicable to radar modes having little ambiguity with respect to clutter, namely the mean frequency recurrence modes (MFR), for example a mode with a recurrence frequency of 10 to 80 kHz approximately.

The last step of the method of the invention consists of the generation, for each distance-frequency interval affected by the clutter from the reflection lobes in the doppler distance-frequency ambiguous zone, of a synthetic channel by an SLO type processing operation which carries out a coherent subtraction between the processed channel and the auxiliary channels.

This processing consists in forming the synthetic channel.

$$S - \Sigma_{i=1,n} W_i A_i$$

an expression in which:

S is the channel to be processed (sum or azimuth or elevation angle), $A_i$ is an ancillary channel taken as the auxiliary channel for purposes of computation, n is the number of available ancillary channels, $W_i$ is an adaptive coefficient computed in real time for each distance-frequency interval of the ambiguous domain.

The coefficient $W_i$ is determined according to the theory of the SLO by the following equation:

$$Wi(d, f) = \frac{E[A_i^* \cdot S]\Omega}{E[A_i^* \cdot A_i]\Omega}$$

in which E [A*B] designates the intercorrelation of A and B on the zone $\Omega$. This zone $\Omega$, which corresponds to a field zone causing said clutter, is taken around the processed interval but does not include this processed interval. This is in order to avoid the disturbances due to a possible target echo.

The zone $\Omega$ is chosen to ascertain the following property in the complex radiation patterns of the antennas:

in the zone $\Omega$, a search is made for:

$$\frac{G\Sigma(d, f)}{G_{Ai}(d, f)} \approx \text{Constant}$$

wherein:

$G\Sigma$ is the gain of the processed channel in the direction of the ground clutter defined by (d, f) in the non-ambiguous domain (d, f), (d, f) being the distance-frequency interval;

$G_{Ai}$ is the gain of the auxiliary channel i in the direction of the ground clutter defined by (d, f) in the non-ambiguous domain (d, f).

In amplitude, this property is obtained by the use of ancillary antennas having a radiation pattern whose form is as close as possible to that of the reflection lobe, these ancillary antennas being pre-existing antennas or else specific antennas of the method of the invention. The obtaining of this property with respect to the phase is done in the way described here above with respect to the compensation for the difference in optical path.

The criteria of choice of the auxiliary channels for purposes of computation with a view to optimizing the method of the invention are as follows:

a radiation pattern shape as close as possible to that of the reflection lobes, the presence of gain in the direction of the reflection lobe and the absence of gain in the direction of the main lobe, in order to avoid any loss of level of power of a possible target echo and preserve the angular measurement functions of the radar, a phase pattern having few fluctuations, which sets the condition for the high stability (fluctuations of less than a few degrees) of its phase center, and low ambiguity between positive frequency and negative frequency.

Figure 4:
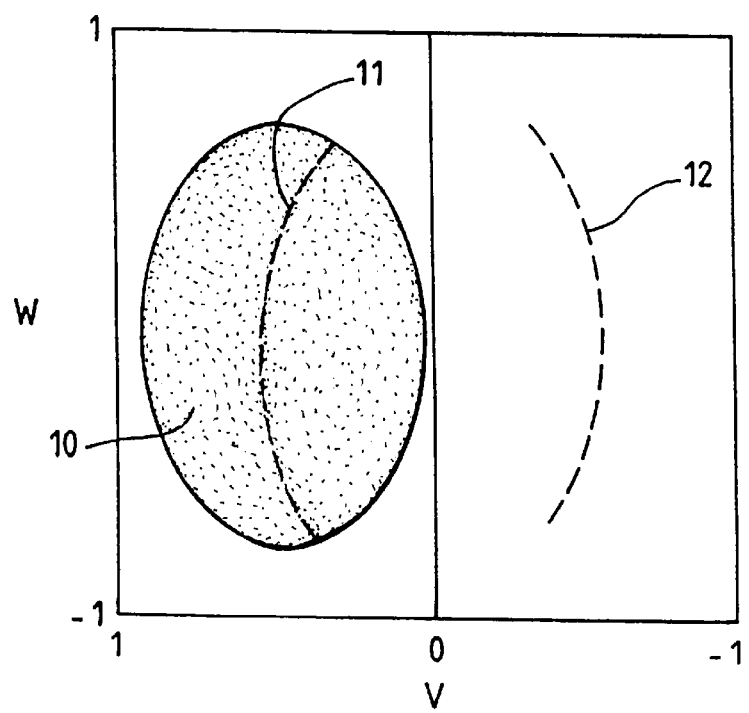
FIG. 4 is a schematic diagram of an ancillary path used by the method of the invention.

The absence of ambiguity between positive frequency and negative frequency is obtained by limiting the gain of the ancillary antenna in the ambiguous direction. FIG. 4 provides a very schematic illustration of an exemplary ancillary channel that has no ambiguity between the negative frequencies and the positive frequencies. This figure shows, at 10, the gain pattern of an ancillary channel capable of processing the reflection lobe on the radome of a radar antenna. At 11 and 12, it shows ambiguous isofrequency lines pertaining to a carrier aircraft in flight, following a rectilinear trajectory. The absence of ambiguity between positive frequency and negative frequency is herein obtained by limiting the gain of the ancillary antenna in the ambiguous direction, this gain being uniform throughout the reflection lobe. The zone $\Omega$ is taken for the same frequency interval.

In conclusion, the method of the invention enables an improvement of the detection of the mobile targets by greatly reducing the ground clutter picked up by the reflection lobe. In the examples of implementation of the method of the invention, for a usual MFR mode, with a single ancillary channel, it has been possible to obtain a reduction in clutter of 10 dB or more, depending on the radars used (this reduction being expressed in terms of the ratio between the power of the clutter without processing of the polluted ambiguous zone and with processing of the polluted ambiguous zone.

What is claimed is:

1. A method of using ancillary channels of at least one ancillary antenna of a radar for attenuation of clutter coming from reflection lobes of a processed channel of a main antenna of the radar, comprising:

determining a position of a phase center of each ancillary channel as well as a position of a local phase center of each reflection lobe;

memorizing said position of said phase center of each ancillary channel and said position of said local phase center of each reflection lobe;

compensating for a difference in signal path between each ancillary channel and said processed channel in a doppler distance/frequency ambiguous domain, for each of a number of computation channels processed and for each ancillary channel, and generating a synthetic channel by performing side lobe opposition processing, including performing a coherent subtraction between the signals of the processed channel considered and those of the ancillary channel considered, on a zone of the doppler distance/frequency ambiguous domain of each of the processed channels.

2. The method according to claim 1, wherein the compensating and the coherent subtraction are done in a desensitized zone of each of a number of ambiguous domains considered.

3. The method according to claim 1, wherein the position of the local phase center of each of the reflection lobes is computed according to least error squares method.

4. The method according to claim 1, implemented for radars working in Mean Recurrence Frequency mode, from approximately 10 to 80 kHz.

5. The method according to claim 1, wherein performing said coherent subtraction comprises performing the following:

$$S - \Sigma_{i=1,n} W_i A_i$$

where S is a channel to be processed, $A_i$ is an ancillary channel taken as an auxiliary channel for purposes of computation, n is a number of available ancillary channels, and $W_i$ is an adaptive coefficient computed for each of a number of distance-frequency intervals of an ambiguous domain.

6. The method according to claim 5, wherein performing said side lobe opposition processing comprises computing locally the coefficients ($W_i$) of the coherent subtraction for each distance/frequency interval of the ambiguous domain from adjacent intervals.

* * * * *